US006944825B2

United States Patent
Coco et al.

(10) Patent No.: US 6,944,825 B2
(45) Date of Patent: *Sep. 13, 2005

(54) REAL-TIME MULTIMEDIA VISUAL PROGRAMMING SYSTEM

(75) Inventors: Geoffrey P. Coco, Seattle, WA (US); Phillip Reay, Seattle, WA (US)

(73) Assignee: Onadime, Inc., Seattle, WA (US)

( * ) Notice: Subject to any disclaimer, the term of this patent is extended or adjusted under 35 U.S.C. 154(b) by 448 days.

This patent is subject to a terminal disclaimer.

(21) Appl. No.: 09/974,727

(22) Filed: Oct. 9, 2001

(65) Prior Publication Data

US 2002/0105538 A1 Aug. 8, 2002

Related U.S. Application Data

(63) Continuation of application No. 08/935,618, filed on Sep. 23, 1997, now Pat. No. 6,331,864.

(51) Int. Cl.[7] .................................................. G06F 3/00
(52) U.S. Cl. ........................ 715/716; 715/967; 715/711; 715/500.1
(58) Field of Search ........................ 395/650; 715/967, 715/716, 853, 835, 839, 771, 970, 763, 717, 726, 500.1, 500, 526

(56) References Cited

U.S. PATENT DOCUMENTS

| 4,914,568 A | 4/1990 | Kodosky et al. |
| 5,291,587 A | 3/1994 | Kodosky et al. |
| 5,301,259 A | 4/1994 | Gibson et al. |
| 5,301,301 A | 4/1994 | Kodosky et al. |
| 5,327,529 A | 7/1994 | Fults et al. |
| 5,377,318 A | 12/1994 | Wolber |
| 5,386,568 A | 1/1995 | Wold et al. |
| 5,388,264 A | * 2/1995 | Tobias et al. ........... 707/103 R |
| 5,398,313 A | 3/1995 | Kojima et al. |
| 5,432,903 A | 7/1995 | Frid-Nielsen |
| 5,475,851 A | 12/1995 | Kodosky et al. |
| 5,537,630 A | 7/1996 | Berry et al. |
| 5,557,730 A | 9/1996 | Frid-Nielsen |
| 5,566,294 A | 10/1996 | Kojima et al. |
| 5,590,271 A | 12/1996 | Klinker |
| 5,613,056 A | * 3/1997 | Gasper et al. ....... 715/500.1 X |
| 5,642,511 A | 6/1997 | Chow et al. |
| 5,687,334 A | * 11/1997 | Davis et al. ............ 715/716 X |
| 5,969,716 A | * 10/1999 | Davis et al. ................. 715/726 |

* cited by examiner

*Primary Examiner*—Raymond J. Bayerl
(74) *Attorney, Agent, or Firm*—Christensen O'Connor Johnson Kindness PLLC (57) ABSTRACT

A user friendly visual programming system with a visual programming interface that allows a user to visually create multimedia programs in real-time. In this system, input and output functions are represented as graphical input and receive interface leads, respectively. A user with no programming skill easily links desired transmit interface leads to desired receive interface leads. In real-time, the output devices perform the functions associated with receive interface leads and any changes to the receive interface leads that occur as a result of any links to transmit interface leads. The user may create complex programs by encapsulating input and receive interface leads in an endless number encapsulation layers.

22 Claims, 8 Drawing Sheets

REAL-TIME MULTIMEDIA VISUAL PROGRAMMING SYSTEM

This application is a continuation of U.S. application Ser. No. 08/935,618, filed Sep. 23, 1997, now U.S. Pat. No. 6,331,864.

FIELD OF THE INVENTION

This invention relates generally to programming environments and, more specifically, to an improved visual programming interface and interface support process.

BACKGROUND OF THE INVENTION

In the fields of computational control and research, events are abstractions which are typically based upon physical phenomena. Researchers or real-time managers may gain access to these events through mathematical, numerical, textual, audio or graphical techniques. Although each of these techniques augments the perspectives brought to bear on an event, each has its advantages and disadvantages when conveying information.

Comprehension of information results from the interplay and juxtaposition of these various techniques. That is, the juxtaposition of graphical, textual, and numerical techniques gives graduated access to data streams. Visual representation, i.e., the use of visual and auditory displays to represent information, has emerged as a desirable environment with which to effectively convey information, because visual representation allows simultaneous presentation of multiple data streams.

Some general-purpose visualization systems include visual programming interfaces for researchers/users to create their own visualization environments from a library of program modules. The researcher/user must have a reasonably good understanding of software coding, because a visual program module within a standard visual programming interface is a software-coded process consisting of a sequence of operations that are organized to produce a specified result. The visual programming interfaces contain graphical tools for users to interactively assemble the modules into dataflow configurations of communication processes so that the users may visualize their data and created dataflow configurations. That is, an output port of one module may be connected to the input port of another module so that when data flows between the modules, the latter module's operations are performed. This requires that the user understand object oriented programming structure and data representation techniques to connect and interpret connected modules. A typical dataflow configuration may thus include a series of interconnected modules that are configured to read data, process that data into new representations, and then display the data on a computer screen.

Despite their flexibility towards customizing dataflow configurations, the general-purpose visual programming systems are not well suited for exploring real-time data streams' interactions or computational research data, or creating multimedia experiences, because they lack essential interactive capabilities and require a user to have expert programming knowledge. For example, user interaction is typically limited to selecting the means for displaying the data without any means for interactively manipulating the data at various stages of the dataflow configuration. As a result, data can only be arranged in specific preconfigured visual arrangements.

In other words, known visual programming systems allow users to merely visualize their data in pre-established ways. This is particularly true in applications involving analysis of empirical data and multimedia programs that allow increased user expression. However, in order to fully analyze or experience their data, users must have real-time tools to probe the value of individual data elements as they impact a variety of parameters. Then they must be able to apply special procedures to a small region-of-interest, e.g., compute the mean data value of a subset of data elements. Further, users must be able to visualize relationships between the data elements in several images or volumes which may span several windows of a computer display.

In summary, there does not exist any visual programming tools that allow a person with little or no programming skill to create in real-time elaborate multimedia audio-visual episodes, computational research studies or human-machine interface with which anyone can interact using a multitude of input and output devices.

The present invention is directed to overcoming the foregoing and other disadvantages. More specifically, the present invention is directed to providing a visual programming interface that allows a user with no programming skill to create in real-time programs for exploring management control options, computational research data relationships or multimedia experiences.

SUMMARY OF THE INVENTION

In accordance with the present invention, a visual programming system with a visual programming interface is provided that allows a user to visually create multimedia programs in real-time. In this system, input and output functions are represented as graphical transmit and receive interface leads, respectively. A user with no programming skill easily links desired transmit interface leads to desired receive interface leads. In real-time, the output devices perform the functions associated with receive interface leads and any changes to the receive interface leads that occur as a result of any links to transmit interface leads. The user may create complex programs by encapsulating transmit and receive interface leads in an boundless number of encapsulation layers, limited only by memory and processor speed.

As will be readily appreciated from the foregoing summary, the invention provides a new and improved method, apparatus and computer-readable medium for visually programming a multimedia program in real-time.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
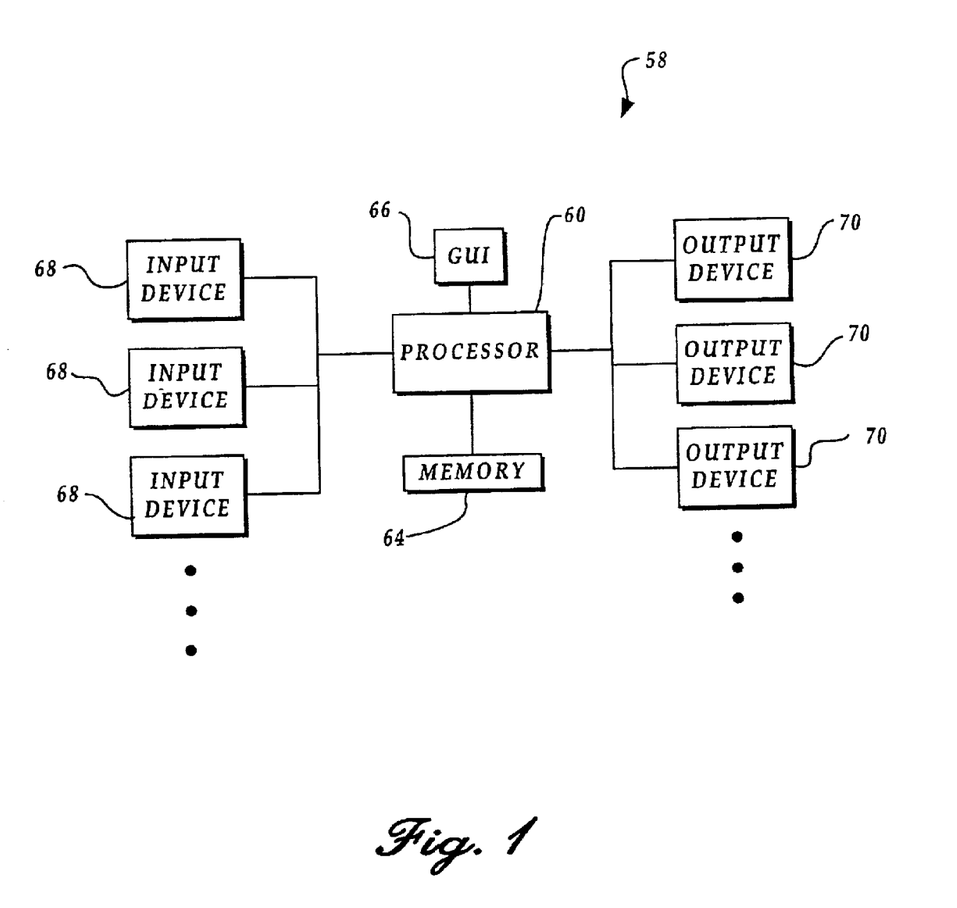
FIG. 1 is a block diagram of a visual programming system formed in accordance with the present invention.

FIG. 1 illustrates a visual programming system 58 that allows a user with no programming skill to create a computer program without writing linear text-based code. The visual programming system 58 includes a processor 60, and a memory 64, a graphical user interface (GUI) 66 and one or more user designated input and output devices 68 and 70 coupled to the processor 60. System 58 allows interconnection between any input and output functions of input and output devices 68 and 70, respectively, regardless of what those devices may be. The input devices are data producing or generating devices, such as a mouse, digital pen, joystick, MIDI keyboard, touch pad, motion, position, light or heat sensors, or internally generated mathematical signals determined from an internal clock signal or some other base information. The output devices react to produced data. Examples of output devices are printers, displays, MIDI sound processors, manufacturing equipment, etc. Input and output devices 68 and 70 may be coupled to processor 60 through a local direct connection or remotely through a local area or public data network. It will be appreciated that the above examples of input and output devices are given for illustrative purposes only, and are not intended to limit the scope of the invention.

An input device function identifies, in code (e.g. a device driver), an operation or function performed by an input device. Input devices are external or internal to the host processor that is performing the present invention. An example of an external input device is a mouse with input functions of left button activate, move mouse vertically, move mouse horizontally, etc. An example of an internal input device is a clock signal with input functions that are mathematical interpretations of the clock signal. In a typical GUI, each of these functions generate or produce data. An output device function identifies, in code (e.g. device driver), an operation or function performed by an output device. If the output device is a display device, examples of output functions are display a square, move the square vertically, move the square horizontally, paint the square a certain color, etc. The display device receives or reacts to data that indicate what to display, where to display it, how to display it, etc. Thus, output device functions react to data.

Figure 3:
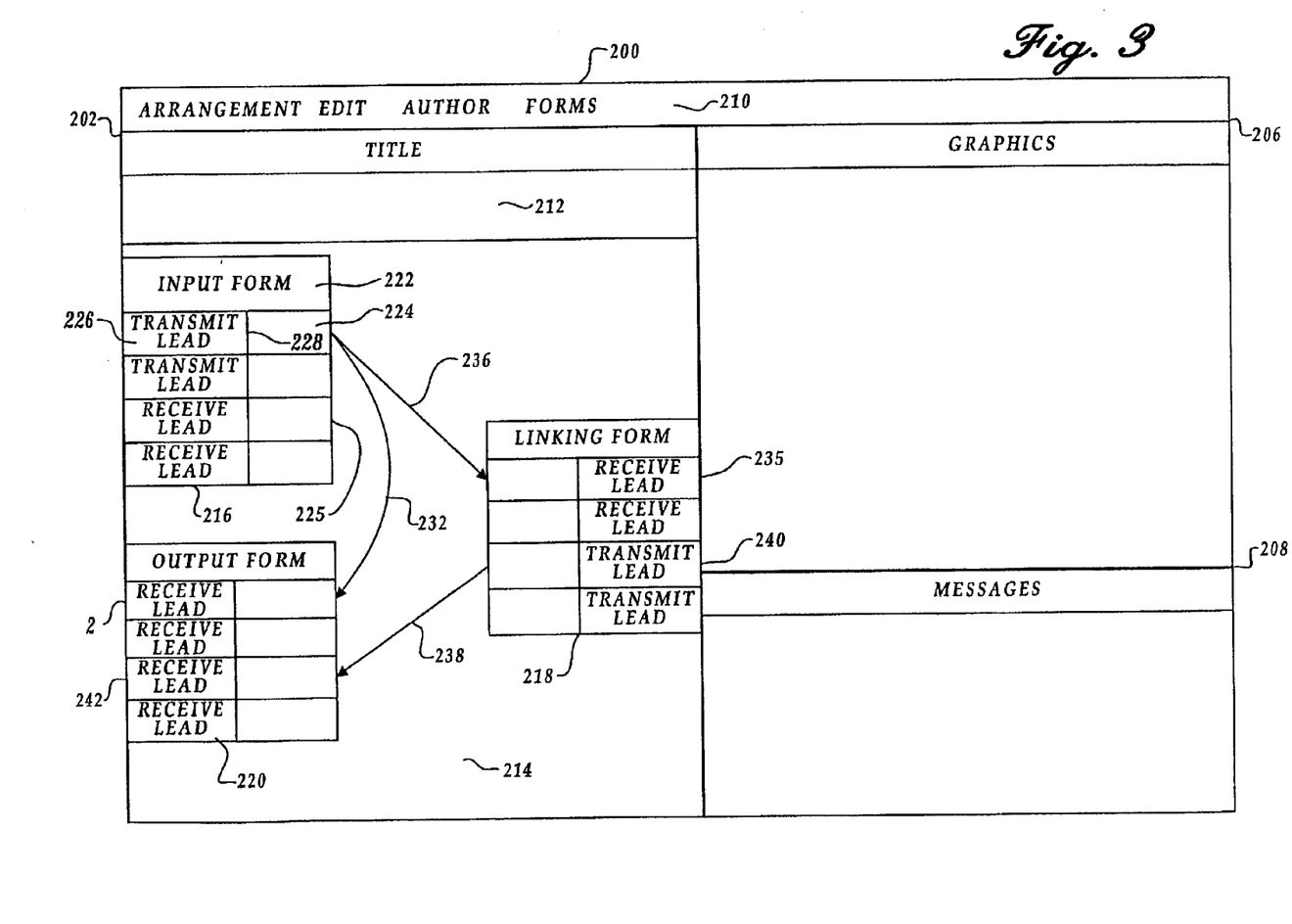
FIG. 3 is an illustration of a graphical user interface used in accordance with the present invention for establishing links between established raw data translations, thereby creating multimedia programs.

GUI 66 of the visual programming system 58 allows a person with any level of programming knowledge to easily create a multimedia program by defining the relationship between any input device function and any output device function. More specifically, the unskilled user can utilize the GUI 66 to assemble and link an input device 68 to an output device 70, in order to easily create and test a program in real-time. The GUI 66 is illustrated in FIG. 3 and described in more detail below.

Figure 2:
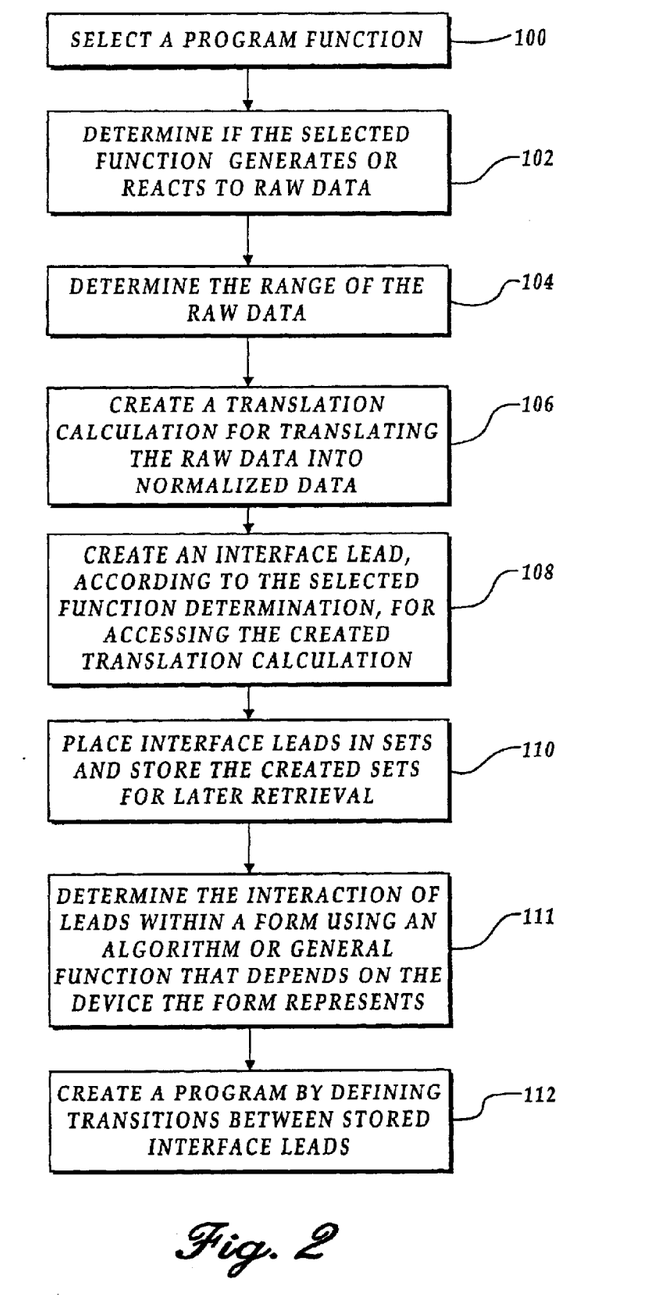
FIG. 2 is a flow diagram illustrating the process for establishing raw data translations and creating a multimedia program based on the translations in accordance with the present invention.

Prior to unskilled user interaction with the GUI 66, however, the raw data translations utilized by input and output functions are determined by a somewhat more skilled programmer. The first seven steps of FIG. 2 illustrate the process which is performed by such a programmer. A somewhat skilled programmer performs these steps because they are performed at a programming level prior to using the GUI 66 to link input devices to output devices, in order to create a program. First, at block 100, a data retrieval, data producing or data manipulating function associated with an input or output device is selected. Functions are typically written into the code of an input or output's device driver. Next in block 102, it is determined if the selected function generates, reacts to or manipulates data, as described above. This data (hereinafter "raw data") is generated by an input function or received by an output function. At block 104, the range of the raw data is determined. The range of the raw data is determined by the raw data's upper and lower limit determined according to predefined requirements of the associated input or output device. At block 106, a translation calculation is created for translating the raw data into normalized data or normalized data into raw data. Normalized data is a bounded scalar number with a predesignated data range. The following equations are the translation calculation for translating raw data into normalized data $$ActNormvalue = \qquad (1)$$
$$MinNorm + \left[ \frac{(ActRaw - MinRaw) \times NormvalueRange}{RawRange} \right]$$

$$NormvalueRange = MaxNorm - MinNorm \qquad (2)$$

where:
ActNormvalue is the actual normalized data value;
ActRaw is the actual raw data value;
NormvalueRange is the range of normalized data;
RawRange is the range of raw data values;
MinNorm and MaxNorm are the minimum and maximum normalized data values within the normalized data range; and
MinRaw and MaxRaw are the minimum and maximum raw data values within the raw range.

The following equations provide the translation calculation for translating normalized data into raw data.

$$ActRawvalue = MinRaw + \left[ \frac{(ActNormvalue - MinNorm) \times RawRange}{NormvalueRange} \right] \qquad (3)$$

$$RawRange = MaxRaw - MinRaw \qquad (4)$$

The scale of normalized data is the same regardless of the raw data scale. Data represented as normalized ranges allows for the simplification in a visual interface, illustrated in FIG. 3 and described below. Normalization produces an underlying language that has only one data type, with the key internal distinction being whether the data is transmitted or received with the interface.

Then in block 108, an interface lead is created, according to the selected function determination, for accessing a specific created translation calculation. An interface lead is a graphical interface tool used in the GUI 66. If the selected function was determined to produce data, the interface lead is a transmit interface lead. If the selected function was determined to react to data, the interface lead is a receive interface lead. Interface leads are further illustrated in FIGS. 3 and 6–8 described below. In block 110, interface leads are placed into sets of leads or forms, that are then stored in memory 64 for easy retrieval and execution through the user interface 66. In block 111, the interaction of the leads within a form are defined using a algorithm or general function that depends upon the device the form represents. For example, if the form manipulates data, the data manipulating algorithm is defined. Forms are implemented as graphical interface tools used in GUI 66, and are illustrated in FIGS. 3 and 6–8 described below. It can be appreciated by one of ordinary skill in the art of device drivers and control programming languages, that these steps can be implemented in various programming languages in various order.

Upon completion of storage of created interface leads and forms, a user with little or no programming skills can create a multimedia program by defining links between the created and stored input and receive interface leads using the GUI 66 as shown at block 112. Because transmit interface leads represent functions that generate data and receive interface leads represent functions that react to data, only a transmit interface lead may be linked to a receive interface lead. Multiple receive interface leads may be linked to a single transmit interface lead. The interface leads may be linked, because of the use of normalized data which allows the linking of leads without concern for raw data types or raw data numerical ranges. It will be obvious to one of ordinary skill in the art of data assignment that the process illustrated in FIG. 2 is not restricted to the order shown.

Figure 4:
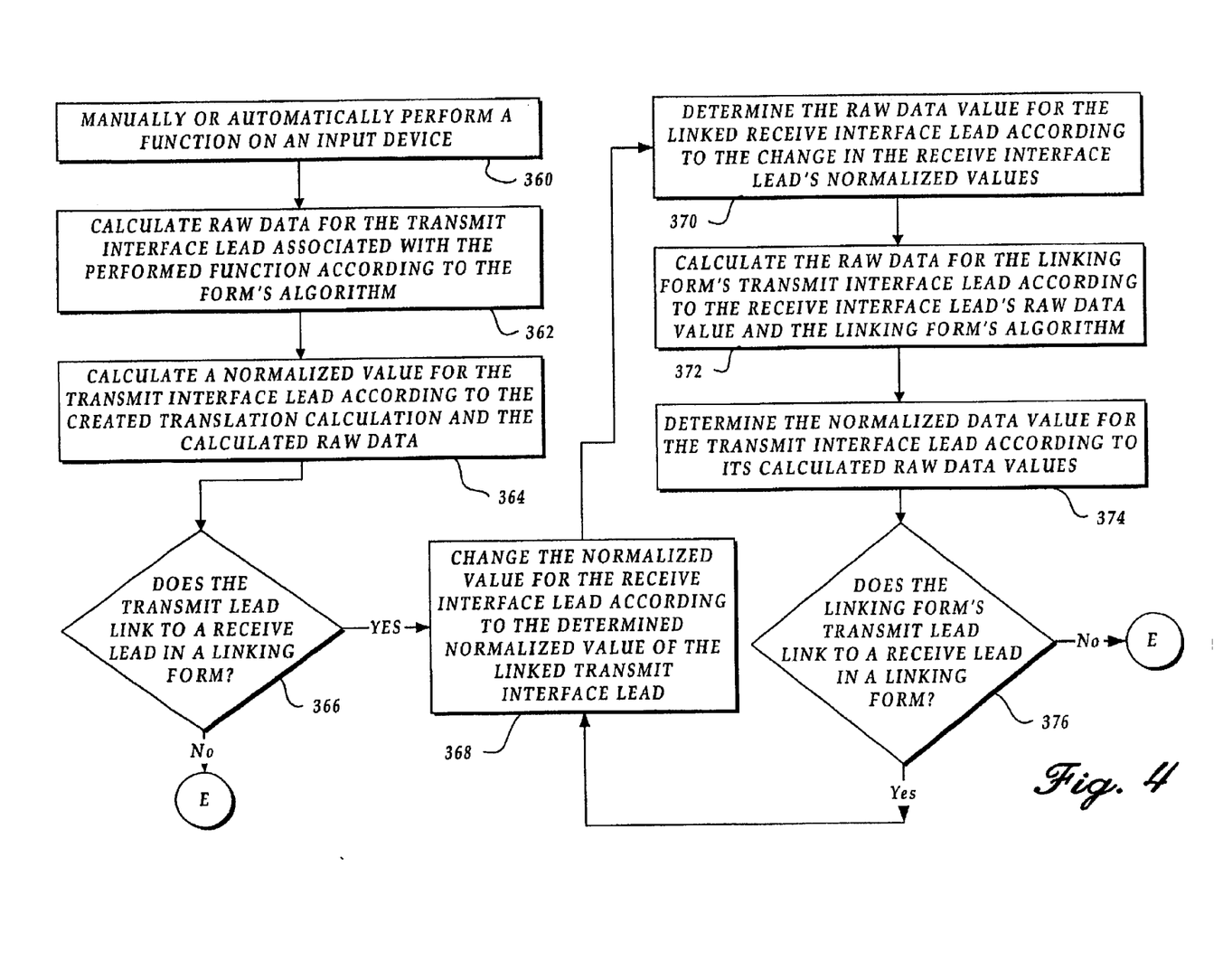
FIGS. 4 and 5 are flow diagrams illustrating the process by which the visual programming system executes the multimedia program created in FIG. 2.
Figure 5:
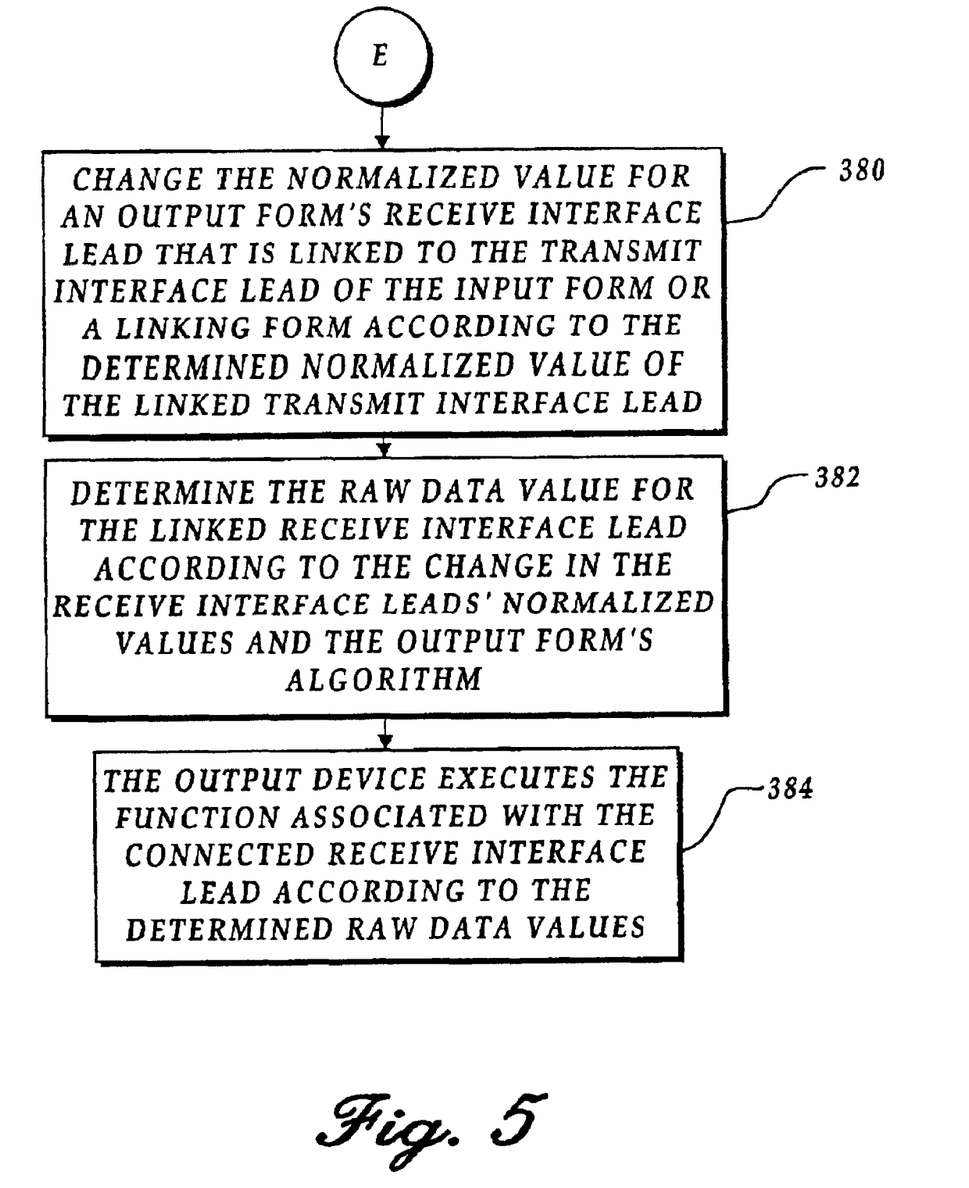

An embodiment of GUI 66 that allows a user with no programming skill to create a multimedia program by defining links between interface leads is described below with respect to FIG. 3. Multimedia program interaction is illustrated in FIGS. 4 and 5 described below.

As shown in FIG. 3, the GUI 66 of the visual programming system 58 is implemented in a window-type operating system. The GUI 66 includes a user interface window 200, whereby user interaction with user interface window 200 is provided by a mouse, a keyboard, a touch screen or any other type of user interface device. The user interface window 200 includes a programming window 202, a display window 206 and a messages window 208. Included as part of the user interface window 200 are pull-down command menus 210, for executing predefined commands, and other features described below. The programming window 202 includes a control area 212 and an operating area 214. Displayed in the operating area 214 are user selected predefined objects, called forms 216, 218 and 220, retrieved from memory using the pull-down command menus 210. The pull-down menus 210 include commands for editing, such as cut, copy and paste, changing styles and manipulating the information displayed in the control area 212 and operating area 214, accessing stored forms, and changing window presentations and preferences.

As described above, the interface leads are transmit 224 or receive 225 interface leads. Interface leads 224 and 225 include a title section 226 and a control section 228. The title in the title section 226 generally describes the function associated with the interface lead 224 and 225 and the control section 228 displays a graphical control of the normalized data value that normalizes the raw data of the function associated with the interface lead 224 and 225. The control section 228 may be of various graphical control formats, such as a slider, meter, menu, number readout, or toggle. Therefore, if the output function represented by a receive interface lead is the volume output of a musical note, the control display featured in the control section 228 of the receive interface lead may be a slider for adjusting the volume of the outputted musical note.

Figure 6:
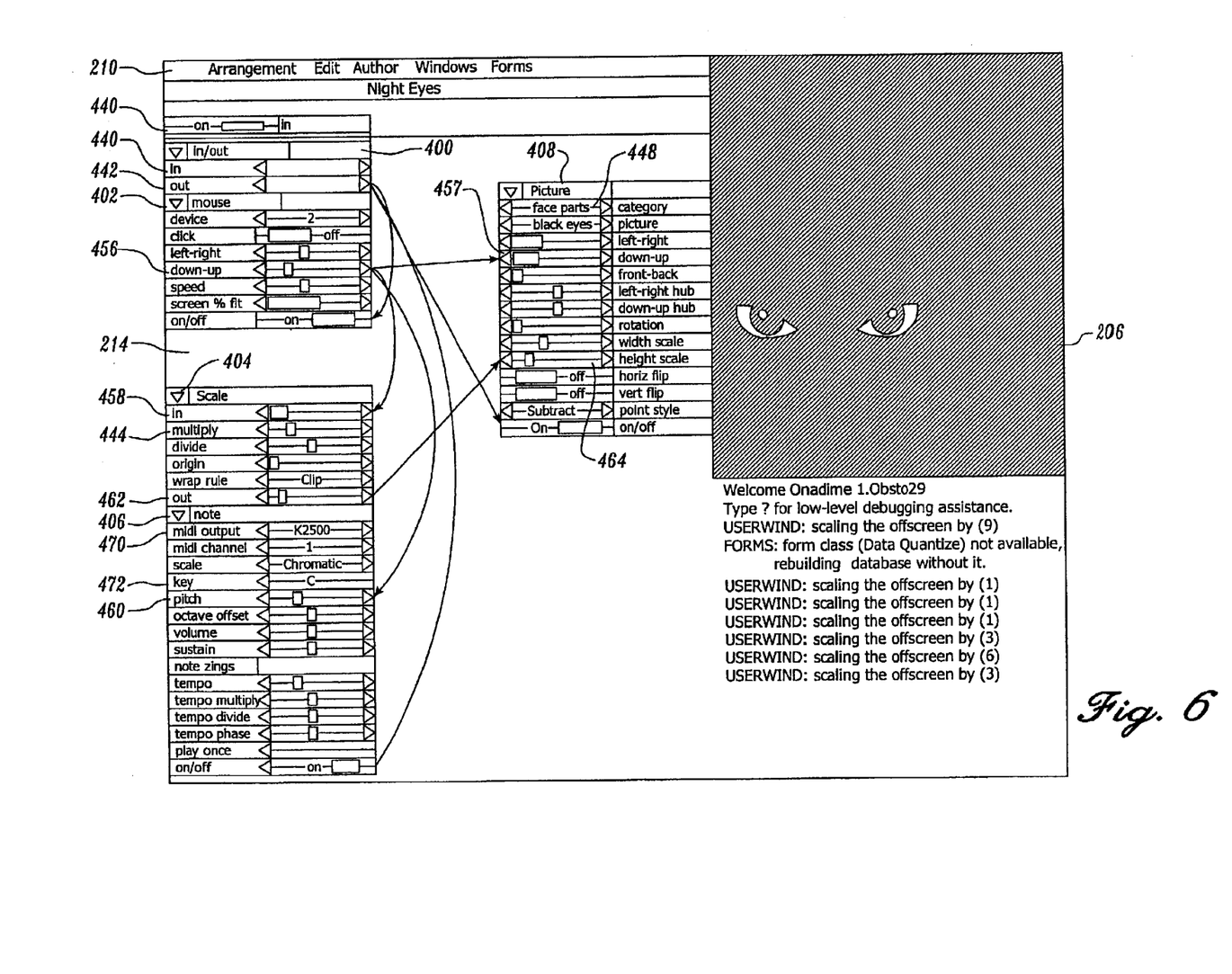
FIGS. 6–8 are illustrations of a program with established links between established raw data translations created in accordance with the present invention.

Forms are rectangular graphical images that include a title section 222 and one or more transmit or receive interface leads displayed below the title section 222. Forms are defined as one of three types: input 216; linking 218; and output 220. Input forms 216 represent manually controlled input devices, such as a mouse, digital pen, joystick, touch pad, etc. or automatically controlled input devices, such as motion, position, light or heat sensors, various types of signals generated from an internal clock signal, etc. Linking forms 218 have no external dependencies or effects. Linking forms 218 serve as a data manipulating link between input and output forms for creating a chain of forms. A linking form 218 may be linked to other linking forms 218 Output forms 220 represent output devices, such as predefined graphical objects (digital video, pictures, simple shapes, etc.), externally connected output devices such as video or audio devices, recorded gestures of an interface device, or computer controlled medical or manufacturing equipment. Predefined within a form is a description or algorithm that defines the relationship of the transmit and receive leads 224 and 225 within it. This defined relationship depends upon what the form represents. Examples of this relationship are illustrated in FIG. 6 and described in more detail below.

As noted above, only a transmit interface lead 224 may be linked to a receive interface lead 225 in a one to many relationship. Within the user interface window 200, transmit and receive interface leads 224 and 225 are identified by different colors or by some other graphically different means. A user links interface leads by dragging and dropping one interface lead onto another, by designating links using the keyboard or by some other user friendly method. When two interface leads are linked an arrow points from the transmit interface lead 224 to the receive interface lead 225, thereby indicating that the manipulation of the function identified by the transmit interface lead 224 will change the function identified by the receive interface lead 225. For example, if the output form 220 represents a graphical image, such as a digital picture, a simple graphics image, digital video, etc., the graphical image that is associated with the output form 220 is presented in the display window 206 in real-time. If a receive interface lead 230 of the output form 220 has a arrow 232 linking it to a transmit interface lead 224 of an input form 216, the linked transmit interface lead 224 translates raw data from an associated input device function to normalized data, thus changing the normalized data of the receive interface lead 230 of the output form 220. The normalized data of the receive interface lead 230 of the output form 220 is translated into raw data, thus changing the displayed graphical image. Also, any manipulation of the control section 228 of any receive interface lead of the output form 220 causes the displayed graphical image to change in real-time, according to the manipulated interface lead and that interface lead's associated function. In other words, if the normalized data is changed, the raw data is changed.

Figure 7:
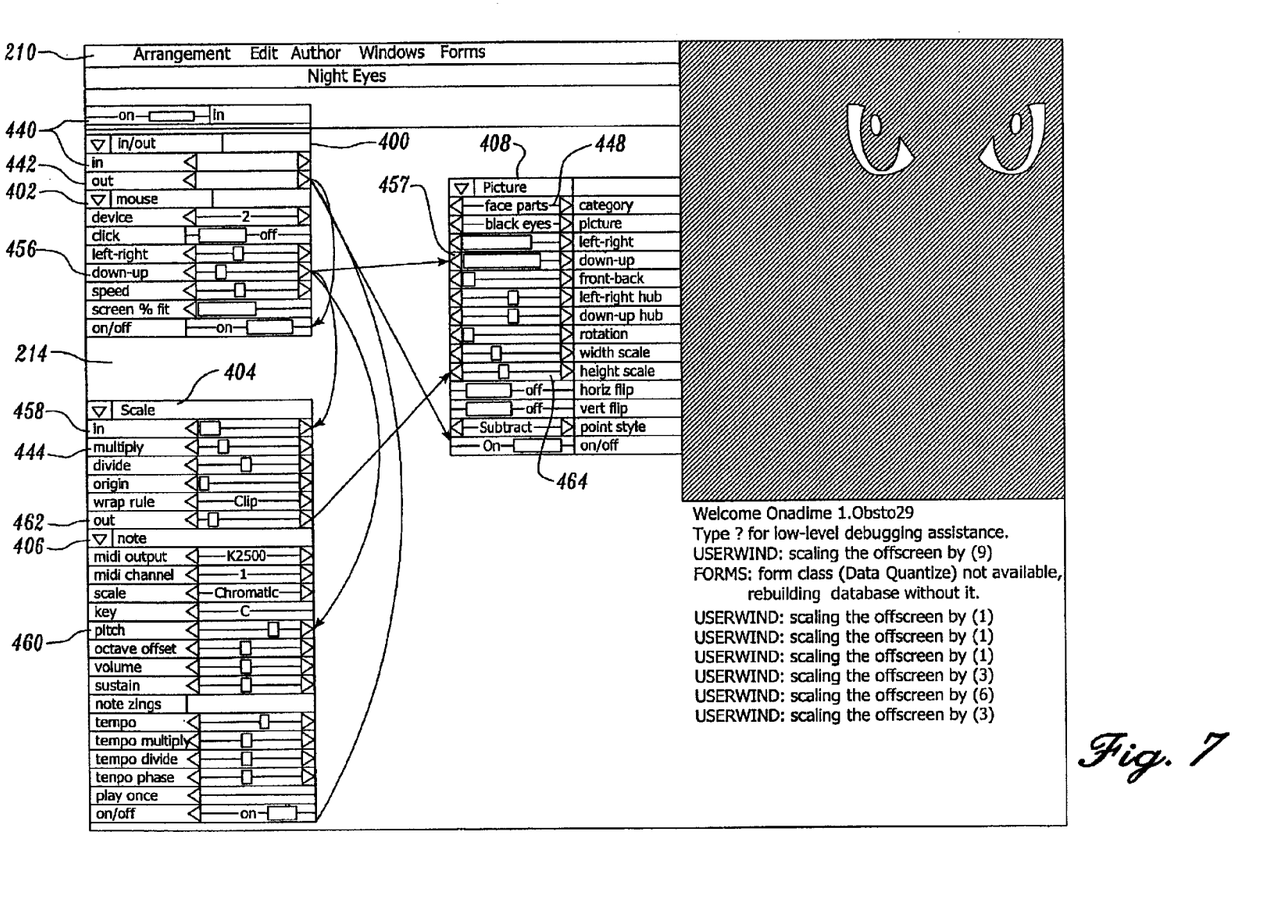

Still referring to FIG. 3, arrow 236 connects receive interface lead 235 of linking form 218 to transmit interface lead 224 of input form 216 and arrow 238 connects transmit interface lead 240 to receive interface lead 242 of output form 220. As described above for linking forms, transmit interface lead 240's raw data value is determined according to the raw data value of receive interface lead 235 and linking form 218's predefined lead relationship algorithm. Then, the normalized data value for transmit interface lead 240 is determined. Next, the normalized data value of transmit interface lead 240 is transmitted to the receive interface lead 242 linked according to arrow 238, and the raw data for the function associated with receive interface lead 242 is determined and executed. Examples of linking forms are also shown in FIGS. 6 and 7.

Figure 8:
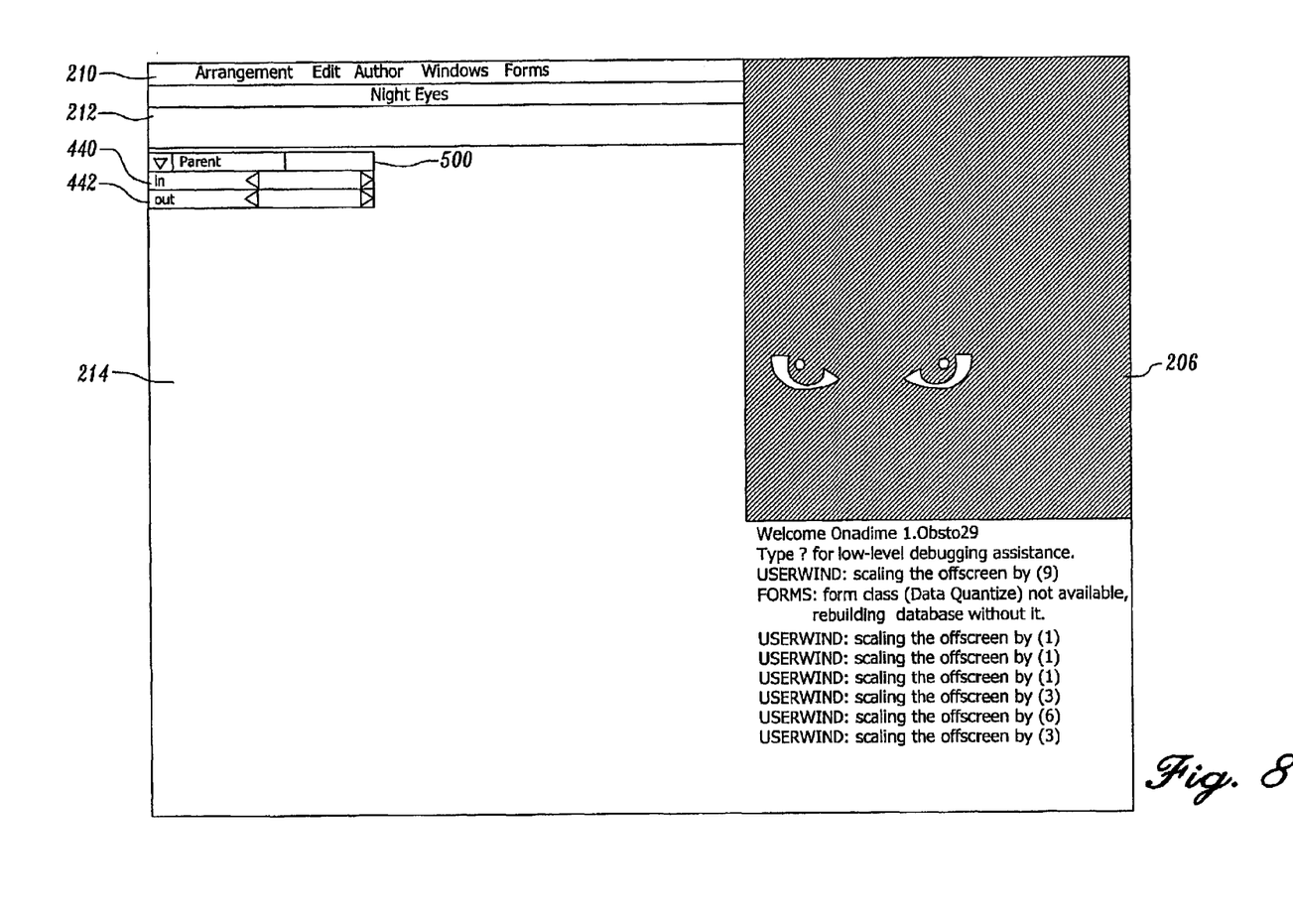

The control area 212 displays interface leads that encapsulate the forms displayed in the operating area 214. Entry of interface leads into the control area 212 is accomplished by activating the display cursor on an interface lead within a form displayed within the operating area 214, dragging the cursor to the control area 212 and deactivating the cursor, thereby producing a copy of the interface lead and leaving it in the operating area 214. The message window 208 provides command help and computer operation and system performance feedback. The display window 206 displays the graphical images associated with graphical-type forms. It can be appreciated to one of ordinary skill in the art of device representation, that virtually any electrically connectable input or output device or any data manipulation process can be represented by a form. Form encapsulation can occur at any level within a nested hierarchy of forms. An interface lead within a form can represent unexposed interface leads in a hierarchical manner (child and parent interface leads). This allows a user to create several child interface leads or forms that refer to the same parent interface lead. When a displayed parent interface lead is manipulated, the normalized data of the child interface leads are kept the same as that of the displayed parent interface lead, because the parent is essentially a ghost of the child. If desired, the user may display child interface leads for providing separate output interface links to a child interface lead. A transmit interface lead in a form may be "locally" available to sibling forms within a parent form, but unavailable to forms external to the parent. A user can specify that a transmit or a receive interface lead is externally available to other forms by placing the lead in the control area 212, thereby "publishing" the interface lead making it visible in the parent's operating area 214. This encapsulation of forms and interface leads simplifies the reuse of information and processing and simplifies visual comprehension of the program. In addition, an encapsulated form behaves as any other form and may be saved independently for later use. An example of form encapsulation is illustrated in FIG. 8 and described below.

The GUI 66 automatically controls placement of the forms within the operating area 214. This ensures that all arrows representing links between leads of various forms are never obscured by another form. This automatic form placement allows a user to see all the links on a particular level. Also, as the cursor passes over an interface lead all of the links for that lead are highlighted.

As shown in FIGS. 4 and 5 illustrate dataflow of a created multimedia program. First, at block 360, a function is manually or automatically performed on an input device. For example, a mouse is moved to the left or a sensor reaches a predefined sensor limit. At block 362, raw data is calculated for an input form's transmit interface lead associated with the performed function, according to the function performed and the form's predefined algorithm. Next at block 364, a normalized data value for the transmit interface lead is calculated according to the created translation calculation and the calculated raw data. Then at decision block 366, any links of the transmit interface lead to other receive interface leads is determined. If the transmit interface lead is linked to a receive interface lead in a linking form, the normalized value for the receive interface lead is changed according to the calculated normalized value of the linked transmit interface lead, see block 368. Further at block 370, the receive interface lead's raw data value is changed according to the change in the receive interface lead's normalized values. The raw data for the linking form's transmit interface lead is calculated according the receive interface lead's raw data value and the linking form's algorithm, see block 372. Then at block 374, the normalized data value for the linking form's transmit interface lead is determined according to the calculated raw data value. At decision block 376, the linking form processing is continued, if another linking form is linked; otherwise, the processing proceeds to all linked output forms.

As shown in FIG. 5, if, at decision blocks 366 and 376, a transmit interface lead is linked to a receive lead of output form, the normalized data value is calculated for an output form's receive interface lead that is linked to the transmit interface lead of the input or linking form, see block 380. This step is performed according to the determined normalized data value of the linked transmit interface lead. For example, if the transmit interface lead's normalized data value goes from 10 to 20, the receive interface lead's normalized data value will go from 10 to 20. Next at block 382, the raw data value is determined for the output form's receive interface lead according to the receive interface lead's normalized values and the output form's algorithm. Finally, the output device associated with the output form executes the function associated with the output form's receive interface lead, according to the determined raw data values, at block 384.

FIGS. 6–8 are screen shots of a multimedia program called Night Eyes created using the GUI 66 illustrated in FIG. 3, wherein Night Eyes execution is performed in accordance with FIGS. 4 and 5. In this example, a user has selected from the pull-down command menus 210 the following predefined forms: in/out 400; mouse 402; scale 404; note 406; and picture 408. The in/out form 400 is a linking form used for activating the other forms. Mouse form 402 is an input form with transmit interface leads that correspond to different mouse functions. The scale form 404 is another linking form for increasing or decreasing normalized data values or restricting the effective range of normalized data used. The note form 406 is an output form that corresponds to a midi sound processor. Picture form 408 is a graphical image output form that represents a particular previously defined image.

The interface leads of in/out form 400 and scale form 404 are not associated with any input or output device functions, because these forms are linking forms. When the control section of the "in" receive interface lead 440 is turned on, a normalized data value is generated from the "out" transmit interface lead 442 of the in/out form 400, because in/out form 400 is a linking form and the link between these interface leads is embedded. In in/out form 400, the "in" receive interface lead 440 is not associated with an output function of an output device. In/out form 400 determines the raw data of the "out" transmit interface lead 442, according to "in" receive interface lead 440 and an internal function, which in form 400 is a straight mapping between the two leads. The "in" receive interface lead 440 generates a normalized data value causing "out" transmit interface lead 442 to produce the same normalized data value for use by other linked receive interface leads. Similarly with scale form 404, the raw data value of "out" transmit interface lead 462 is determined according to scale forms 404 predefined algorithm and the set values of its receive interface leads.

The mouse form 402, note form 406 and picture form 408 are turned on, because arrows link their "on/off" receive interface leads to "out" transmit interface lead 442 of the in/out form 400. When the normalized data value of "out" transmit interface lead 442 goes to high, so will the normalized data values of the linked "on/off" receive interface leads. In all the linked "on/off" receive interface leads, a high normalized data value is translated into an "on" raw data value. When the mouse form 402 is turned on, mouse raw data signals are received and translated into normalized data values, according to the receive interface leads within the form. When the picture form 408 is turned on, the stored picture, i.e., black eyes, indicated within the control section of "picture" receive interface lead 448, is retrieved from its predefined memory location and displayed within the display window 206 in real-time. The function associated with the "picture" receive interface lead 448 is display picture.

When the note form 406 is turned on, the functions indicated by the receive interface leads within the note form 406 ("midi output" receive interface lead 470 indicates K2500 and "key" receive interface lead 472 indicates the key C) are performed. The note played is in the key C at the pitch level set in the "pitch" receive interface lead 460 through a midi output K2500.

As shown in FIGS. 6 and 7, a user with any level of programming skill may link the "down-up" transmit interface lead 456 of the mouse form to the "down-up" receive interface lead 457 of the picture form 408. The user may also link the "down-up" transmit interface lead 456 to the "in" receive interface lead 458 of the scale form 404 and to the "pitch" receive interface lead 460 within the note form 406. Further, the "out" transmit interface lead 462 of the scale form 404 has been linked to the "height scale" receive interface lead 464 of the picture form 408. Therefore, when the mouse is moved up, as shown in FIG. 7 by the right movement of the slide bar of the "down-up" transmit interface lead 456, the slide bar of "down-up" transmit interface lead 457 (to which the "down-up" transmit interface lead 456 is linked) moves to the right causing the eyes to move up in the display area 206. In addition, the slide bar of "pitch" receive interface lead 460 (to which the "down-up" transmit interface lead 456 is also linked) moves to the right causing the pitch of the midi output to increase. Finally, the slide bar of "height scale" receive interface lead 464 (to which the "down-up" transmit interface lead 456 is also linked) moves to the right, at a scaled value as determined by scale form 404, causing an increase in the black eyes' height.

The "in" receive interface lead 440 of the in/out form 400 has been placed in control area 212. This allows "in" receive interface lead 440 of form 400 to be operable or accessible at a higher hierarchical level. As shown in FIG. 8, the "in" receive interface lead 440 that was placed in control area 212 has been entered into a new form, Parent form 500, at a higher processing level. Thus, a user programming at the level illustrated in FIG. 8, experiences all the functionality of the forms from FIG. 7 and has space within the operating area 214 to create more form relationships for the program Night Eyes. The capitalization of the title of Parent form 500 indicates that this form encapsulates previously defined form interaction within one or more lower level operating areas 214. Double clicking the cursor on Parent form 500's title presents the encapsulated information, i.e., the forms 400-408 and the created links, shown by arrows displayed with the operating area 214 of FIG. 6. Essentially, Parent form 500 becomes a parent form and forms 400-408 become child forms.

The program Night Eyes is just an illustrative example of what the normalization of raw data allows a user of no programming skill to create. In this programming system virtually any input or output can be linked and manipulated in a simple and easy to use interface. Visualization and sonification are combined in any way the user sees fit. The multimedia programs created using the GUI 66 illustrated in FIG. 3 are a new form of incremental compilation. When a user creates or changes a link between two forms within an episode, the modification is immediate and the change can be tested without a delay for compilation. This reduces errors that result from making numerous changes before testing the modifications, and increases the rate of experimentation and evolution.

In summary, this invention is focused on a user friendly visual programming system that allows a user to combine, link and manipulate predefined forms representing data input devices or data output devices. The user can thereby encapsulate data and functions of many forms, and create hierarchical programs by using a visual programming system rather than by writing code. The number of encapsulation levels is only restricted by the amount of memory and processing power of the host computer. The present invention utilizes normalized data values to provide a universal mechanism for passing data values between input and output devices. As can be readily appreciated by those of ordinary skill in the art of interface, the features of the graphical user interface of the present invention could incorporated into any other type of interface, such as a voice actuated interface.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for interoperating data input and data output, the method comprising:

representing an audio input with a transmit control;

representing a visual output with a receive control;

linking at least one transmit control to at least one receive control without determining if the type of audio input represented by the transmit control is compatible with the type of visual output represented by the receive control; and causing the visual output to change in real-time by changing the audio input represented by the transmit control that is linked to the at least one receive control.

2. The method of claim 1, wherein in the visual output comprises animation.

3. The method of claim 1, wherein the audio input is sound.

4. The method of claim 1, wherein the audio input is voice.

5. The method of claim 1, wherein representing the audio input with a transmit control comprises:

creating a translation calculation for translating the audio input into normalized data; and associating a transmit control with the translation calculation.

6. The method of claim 1, wherein representing the visual output with a receive control comprises:

creating a translation calculation for translating the normalized data into visual output; and associating a receive control with the translation calculation.

7. The method of claim 1, wherein linking at least one transmit control to at least one receive control comprises linking at least one transmit control to a plurality of receive controls.

8. The method of claim 1, wherein linking at least one transmit control to at least one receive control comprises linking a plurality of transmit controls to at least one receive control.

9. An animation program embodied on a computer-readable medium, wherein the output of said animation program is dynamically generated in real-time by a method comprising:

representing input to said animation program with at least one transmit control;

representing the output of said animation program with at least one receive control;

defining a relationship between said at least one transmit control and said at least one receive control without determining if the type of data input to said animation program is compatible with the type of output from said animation program; and dynamically generating the output of said animation program in real-time by changing the input to said animation program represented by said at least one transmit control and linked to said at least one receive control representing the output of said animation program.

10. The animation program of claim 9, wherein the input to said animation program comprises audio input.

11. The animation program of claim 9, wherein the input to said animation program comprises motion input.

12. The animation program of claim 9, wherein the input to said animation program comprises musical instrument digital interface input.

13. The animation program of claim 9, wherein linking at least one transmit control to at least one receive control comprises linking at least one transmit control to a plurality of receive controls.

14. The animation program of claim 9, wherein linking at least one transmit control to at least one receive control comprises linking a plurality of transmit controls to at least one receive control.

15. A computer-implemented method for changing an animated image in response to input data from an input device, the method comprising:

receiving input data from the input device;

translating the input data from the input device into normalized data;

translating the normalized data into output data associated with the animated image, wherein translating the input data into normalized data and translating the normalized data into output data is based on a relationship defined between the input data and the output data, and wherein said relationship is defined without determining if the type of input data is compatible with the type of output data; and causing the animated image to change in real-time in reaction to the input data that is received from the input device and that is translated into the output data associated with the animated image.

16. The method of claim 15, wherein translating the input data from the input device into normalized data comprises:

defining a raw input data range for the input data;

defining a normalized input data range for the input data; and converting the input data received from the input device into normalized input data within the normalized input data range based on the raw input data range.

17. The method of claim 16, wherein translating the normalized data into output data comprises:

defining a raw output data range for the output data;

defining a normalized output data range for the output data; and converting the normalized input data into output data within the raw output data range based on the normalized output data range.

18. The method of claim 17, further comprising:

defining a relationship between the normalized input data and the output data; and setting the normalized output data based on the normalized input data and the defined relationship between the normalized input data and the output data.

19. The method of claim 18, further comprising:

defining a relationship between the normalized input data and the normalized output data; and setting the normalized output data based on the normalized input data and the defined relationship between the normalized input data and the output data.

20. The method of claim 15, wherein the input device comprises an audio device.

21. The method of claim 15, wherein the input device comprises a positioning device.

22. The method of claim 15, further comprising receiving input data from a plurality of input devices.

* * * * *

UNITED STATES PATENT AND TRADEMARK OFFICE
CERTIFICATE OF CORRECTION

PATENT NO. : 6,944,825 B2
DATED : September 13, 2005
INVENTOR(S) : G.P. Coco et al.

It is certified that error appears in the above-identified patent and that said Letters Patent is hereby corrected as shown below:

<u>Title page,</u>
Item [56], References Cited, insert
-- OTHER PUBLICATIONS
Konstantinos Konstantinides and John R. Rasure, "The Khoros Software Development Environment for Image and Signal Processing," 8395 IEEE Transactions on Image Processing, 3(1994) May, No. 3, New York, US, pp. 243-252. --.

Item [57], ABSTRACT,
Line 12, "number encapsu-" should read -- number of encapsu- --.

<u>Column 10,</u>
Line 33, "wherein in the" should read -- wherein the --.

Signed and Sealed this

Third Day of January, 2006

JON W. DUDAS
*Director of the United States Patent and Trademark Office*